United States Patent Office 3,476,114
Patented Nov. 4, 1969

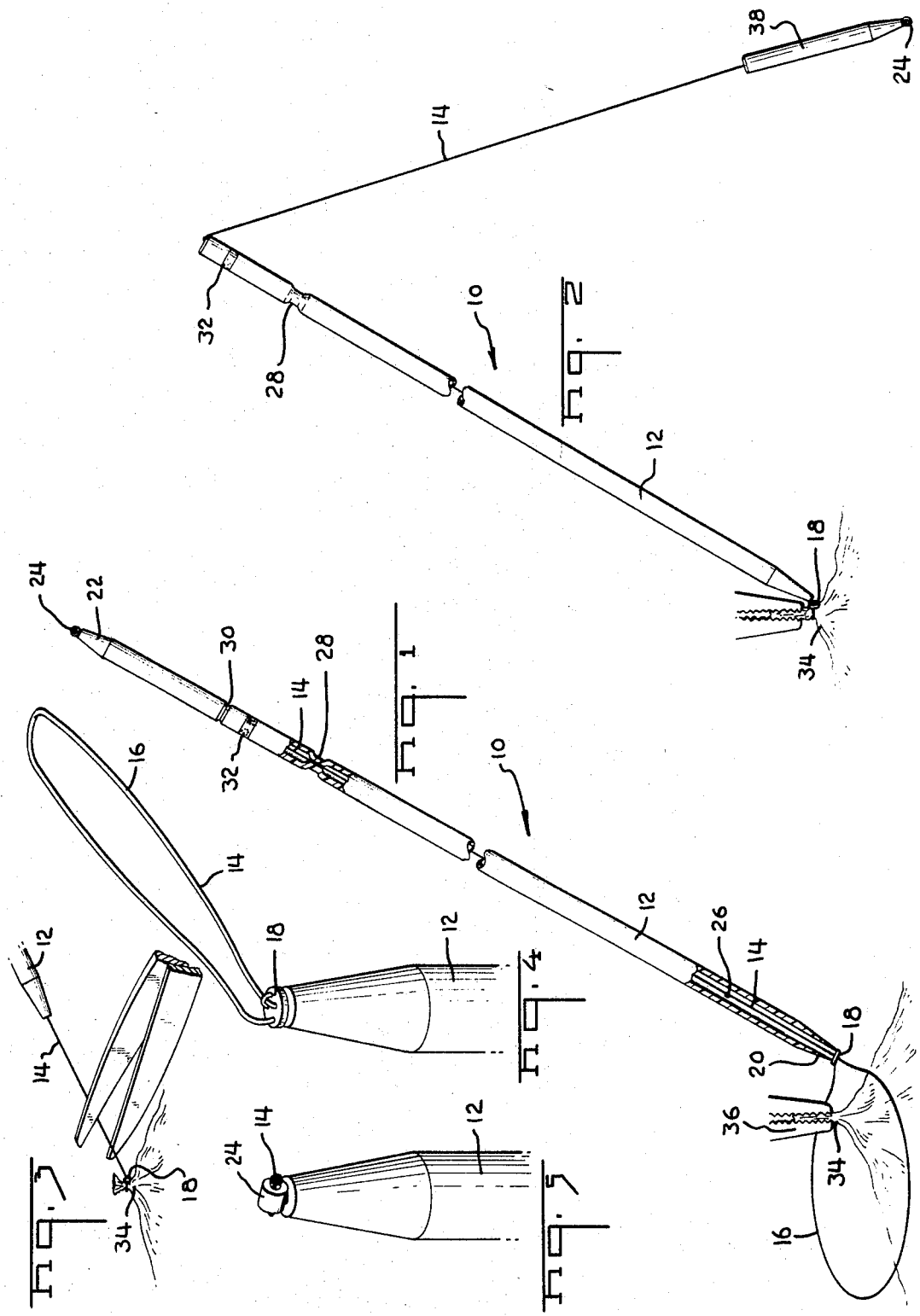

3,476,114
LIGATING IMPLEMENT
Suel Grant Shannon and Norwood Claude Graeff, Harrisburg, Pa., assignors to AMP Incorporated, Harrisburg, Pa.
Continuation-in-part of application Ser. No. 506,692, Nov. 8, 1965. This application Jan. 10, 1967, Ser. No. 608,421
Int. Cl. A61b *17/12;* A61f *13/10*
U.S. Cl. 128—326                              4 Claims

ABSTRACT OF THE DISCLOSURE

An elongated instrument for use in effecting a tying operation comprising a tubular body member through which an elongated ligature extends. An apertured disc threadably receives the ligature and serves as a one way knot for a ligature noose which is controlled by means of the tubular member.

CROSS-REFERENCES TO RELATED APPLICATIONS

This application is a continuation-in-part of our earlier filed application Ser. No. 506,692 filed Nov. 8, 1965, now Patent No. 3,426,757. Reference is also made to application Ser. No. 494,103 filed Oct. 8, 1965, now Patent No. 3,409,014 for a complete description of the locking disc used in conjunction with the present invention.

BACKGROUND OF THE INVENTION

Field of the invention

The ligation of severed blood vessels during a surgical procedure.

Description of the prior art

The prior art method of tying bleeders consists normally of either manually tying a surgeon's knot about the bleeder or using an electrical spark which will cause coagulation in the bleeder. Neither of these methods are practical for tying deep bleeders, i.e. bleeders which occur substantially below the body surface.

SUMMARY

The invention provides an elongated tubular member which is capable of reaching remote areas within the body. A noose and disc are provided for effecting the tie, the tubular member being capable of contracting the noose for ligation.

The principal object of the invention is to provide a device which renders easy the tying of deep bleeders.

A further object is to provide a device which is capable of tying bleeders in remote areas.

Another object is to provide a device which is disposable after a single use to thereby eliminate resterilization problems.

BRIEF DESCRIPTION OF THE DRAWING

FIGURE 1 is a view partly in section of the ligating device prior to tying;

FIGURE 2 is a view similar to FIGURE 1 but showing the device after a tie has been effected;

FIGURE 3 is a fragmentary view showing the completion of a ligating operation;

FIGURE 4 is an enlarged fragmentary view showing the tying portion of the ligating device; and FIGURE 5 is an enlarged fragmentary view showing further details of the device.

DESCRIPTION OF THE PREFERRED EMBODIMENT

The attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

The ligating device of the present invention is shown in FIGURE 1 and indicated generally at 10. The device comprises an elongated tubular body member 12 which may be of any suitable material but is preferably made of a plastic so that the member is inexpensive to produce and may be disposed after a single use. A thread 14 passes through the member 12 in a manner to be described and has a noose portion 16 formed by a disc 18. The thread 14 is made from standard suture material such as nylon, silk, cotton or surgical gut and the disc 18 is preferably made from a plastic such as nylon but may be stainless steel or may be molded from an absorbable gelatinous material. For a complete description of the noose and disc configuration and operation reference is made to U.S. patent application Ser. No. 494,103 filed Oct. 8, 1965 by Suel G. Shannon entitled Surgical Device. Briefly the thread or ligature 14 passes through the disc 18 in a manner to produce a one-way knot, that is the disc allows the noose to be rather freely contracted but the looping configuration through the disc resists any subsequent enlargement of the noose.

The thread 14 which extends from the disc 18 passes into the tube 12 at a tapered end 20. The tapered end permits greater visibility by the surgeon when the device is in use. The thread or ligature 14 passes entirely through member 12 and exits from the distal end 22 which is also tapered for convenience. A nylon block or the like 24 is provided and is secured to the free end of the ligature 14 for fixing said ligature to the end of member 12. The block 24 is of sufficient size so that it cannot enter the hollow interior of the member 12. Other arrangements could be used for attaching the ligature to member 12.

A raised surface 26 is provided on the ligature within the member 12, such raised surface being conveniently a knot or the like formed in the ligature. The member 12 has a constricted portion 28 of reduced diameter, said portion being located towards the distal end 22 of the body member. The diameter of portion 28 is smaller than the external diameter of the knot 26 so that the knot cannot pass through the portion 28 for a reason to be described.

The member 12 is provided with a weakened section 30 located between the distal end 22 and the constricted portion 28. Such weakened section may be formed by scoring or a similar method. A stripe 32 which may be painted or color coded to be conspicuous to the eye is located adjacent the section 30 so that a user of the ligating device may readily detect the area of the weakened section.

Having now described the ligating device, the operation will be set forth. A severed vessel such as 34 as seen in FIGURE 1 which is to be ligated is surrounded by the noose 16 of the device 10. The noose is in its expanded condition and is quite large with relation to the size of the bleeder 34. A hemostat 36 is used to grasp the end of the vessel and to clamp the vessel closed to perform temporary hemostasis. The bleeder 34 may be in any remote area of the body such as at the bottom of a deep incision, located in the brain cavity, etc. It is ex- tremely difficult to tie deep bleeders by hand since the surgeon does not have suitable means for placing a hand knot in an area that cannot be reached with the surgeon's fingers. The difficulty is that the knot cannot be tightened since the surgeon cannot pull on the free ends of the string in a normal manner. Electro-coagulation methods are also not suitable for deep ties because it is not advisable to discharge electric sparks in areas deep within the body. The device 10 is capable of reaching these remote areas due to its thin elongated configuration.

With the vessel clamped and surrounded as shown in FIGURE 1 the surgeon will break the body member 12 at the weakened section 30. The freed section 38 of the device is now pulled rearwardly relative to the forward section of the body member thus drawing the ligature 14 through the body member to thus contract the noose 16. When the noose is fully contracted as seen in FIGURE 2 the locking disc 18 will prevent subsequent enlargement of the noose to thereby effect permanent ligation of the vessel. The body member is then moved rearwardly along the ligature 14 to the position shown in FIGURE 3 at which time a scissors will be used to sever the ligature adjacent the disc 18. The body member 12 and its free end 38 will be joined after use by the ligature 14. The knot 26 on the ligature will, through co-operation with the constricted portion 28, prevent the body member from separating from the ligature and free end. By maintaining the used device in one piece there is less danger of a portion of the device being left in the wound and the devices may be easily counted before the wound is closed.

Some variation is permissible in the method of placing the noose 16 around the vessel 34. For example the vessel could be first clamped by a hemostat and subsequently the noose could be passed over the rearward end of the hemostat and down to the position shown in FIGURE 1 or the noose could be placed around the nose portion of the hemostat so that when the hemostat engages the vessel the noose will be in its approximate vessel encircling position. These variations permit some flexibility depending on the desires of the surgeon and the particular location of the vessel to be ligated.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims prior art.

We claim:
1. Apparatus for use in tying comprising a disc having a plurality of apertures therein, a thread passed through said apertures in a manner to produce a noose, an elongated tubular body member, said disc being positioned adjacent a first end of said body member and being larger than the internal diameter of said body member at said first end, said thread extending from said disc and through said body member and terminating at a second end of said body member, said body member having a weakened section disposed between said first and second ends for permitting said body member to be separated at said weakened section thereby permitting the movement of said second end away from said first end, movement of said second end away from said first end causing said thread to be drawn through said body member to thereby contract said noose.

2. Apparatus as set forth in claim 1 further comprising an enlarged surface on said thread within said body member, and a portion of said body member being of reduced internal diameter to thereby prevent said thread from passing out of said body member.

3. Apparatus as set forth in claim 1 wherein said thread is a surgical ligature and wherein said disc is composed of suture material whereby said tying apparatus is adapted for ligating blood vessels during a surgical procedure.

4. Apparatus as set forth in claim 1 wherein said disc permits said noose to be contracted but prevents said noose from being enlarged.

References Cited

UNITED STATES PATENTS

| 480,870 | 8/1892 | Harris | 128—320 |
|---|---|---|---|
| 843,494 | 2/1907 | Rosenberg | 206—63.3 |
| 873,514 | 12/1907 | Davis | 119—153 |
| 1,334,916 | 3/1920 | Lukens | 206—63.3 |
| 1,452,801 | 4/1923 | Goodchild | 128—272 X |
| 1,461,864 | 7/1923 | Day | 128—320 |
| 1,855,546 | 4/1932 | File | 128—326 |
| 2,012,776 | 8/1935 | Roeder | 128—326 |
| 2,610,631 | 9/1952 | Calicchio | 128—326 |

OTHER REFERENCES

AMP Publication Brochure (IS 2157), Jan. 4, 1967, pp. 1 and 2.

DALTON L. TRULUCK, Primary Examiner

U.S. Cl. X.R.

128—346